Feb. 28, 1956     R. M. OHLSEN ET AL     2,736,201
AUTOMATIC METERING AND SAMPLING STATION
Filed April 7, 1953                       2 Sheets-Sheet 1

Inventors: R. M. Ohlsen
G. A. Smith
By: J. H. McCarthy
Their Agent

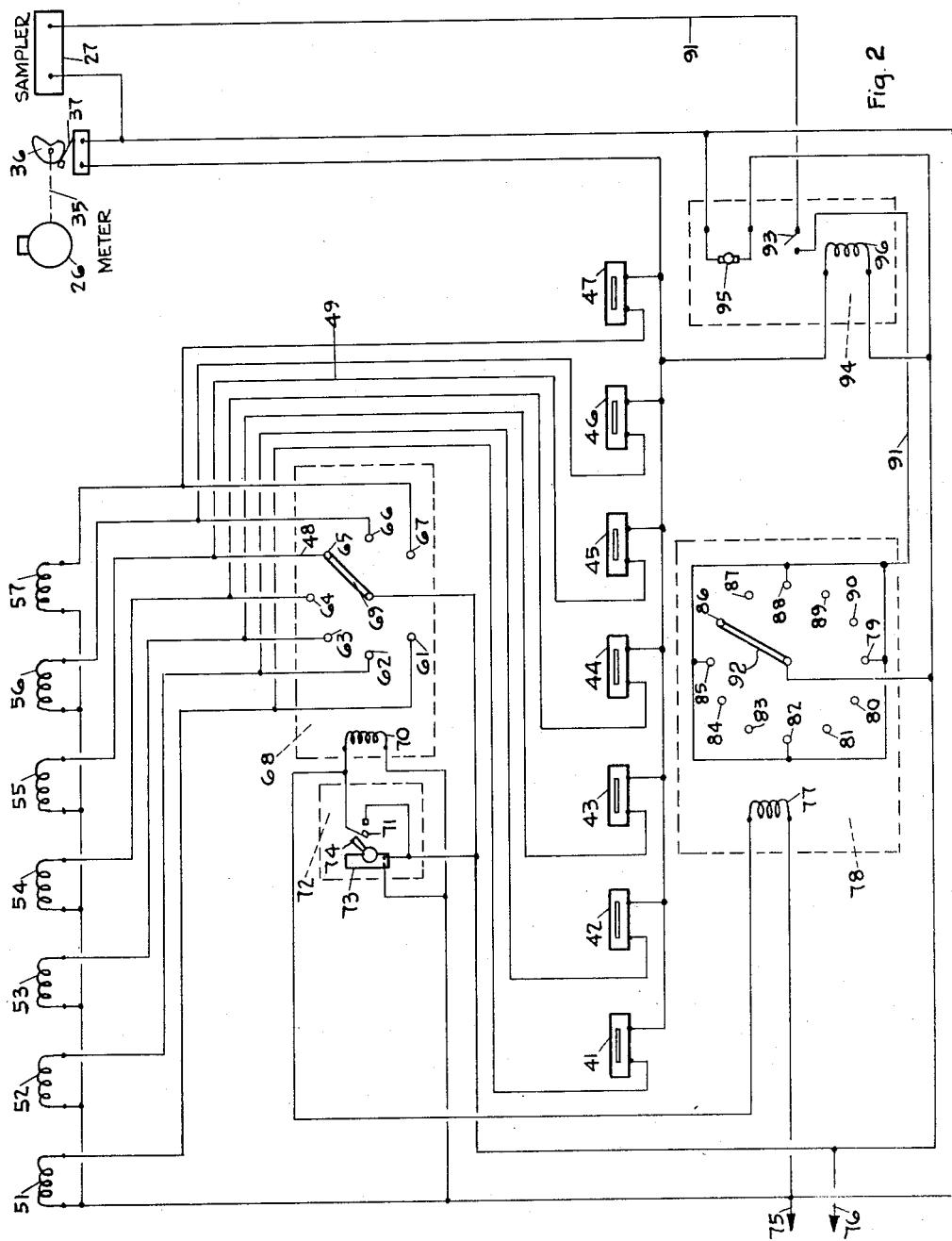

United States Patent Office 2,736,201
Patented Feb. 28, 1956

2,736,201

AUTOMATIC METERING AND SAMPLING STATION

Rodney M. Ohlsen, New Orleans, La., and Grafton A. Smith, Tulsa, Okla., assignors to Shell Development Company, Emeryville, Calif., a corporation of Delaware Application April 7, 1953, Serial No. 347,212

10 Claims. (Cl. 73—422)

This invention relates to oil field production and pertains more particularly to apparatus for automatically metering and sampling a large number of wells on a predetermined schedule.

In many oil fields, an oil producing company may pump or flow crude oil from a large number of wells which may be located on several leases of land owned by different individuals. In order to determine accurately the amount of royalty payment due to each individual, and to acquire well production information for determining the most effective way of producing each well, it is essential that the amount of fluid produced by each well be metered at predetermined intervals, say, once a week.

Since it is common in many oil fields to produce water along with the oil, metering of the well fluid is merely a measure of the total amount of oil and water produced. Therefore, in order to determine what portion of the produced fluid is oil, it is necessary to sample the well fluid periodically. From this sample, the amount of oil produced can be ascertained and this value serves as a basis for royalty payments.

At present, the daily production of a single oil well is generally ascertained by a pumper or gauger who sets the necessary valves in the field piping system to divert the well production into a test tank. After the oil from the well has been allowed to flow into the tank for a predetermined time, say, for 8 or 24 hours, the gauger returns, measures the amount of well fluid collected in the tank, samples the fluid in the tank, drains the tank to a central storage tank, and resets the necessary valves to cause the fluid from the well to flow to the central storage tank. This procedure of measuring well production is very expensive and time consuming in that it requires a gauger to make at least two trips to a single well within a period of about 24 hours. It may be readily seen that a large number of gaugers would have to be employed by an oil company owning numerous wells, many of which may be widely spaced.

It is therefore a primary object of the present invention to provide an apparatus for automatically metering a well for a predetermined period at regular intervals.

A further object of this invention is to provide an apparatus for automatically metering the production of fluid from a group of oil wells, said wells being metered one at a time, with the apparatus continuously repeating the metering sequence after all of the wells have been once metered.

Another object of this invention is to provide an apparatus for sampling at predetermined intervals the output of production fluid from a single well or from each of a group of oil wells.

These and other objects of this invention will be understood from the following description taken with reference to the attached drawing, wherein:

Figure 2 is a diagrammatic sketch illustrating an electrical circuit used with the present metering and sampling apparatus.

Figure 1:
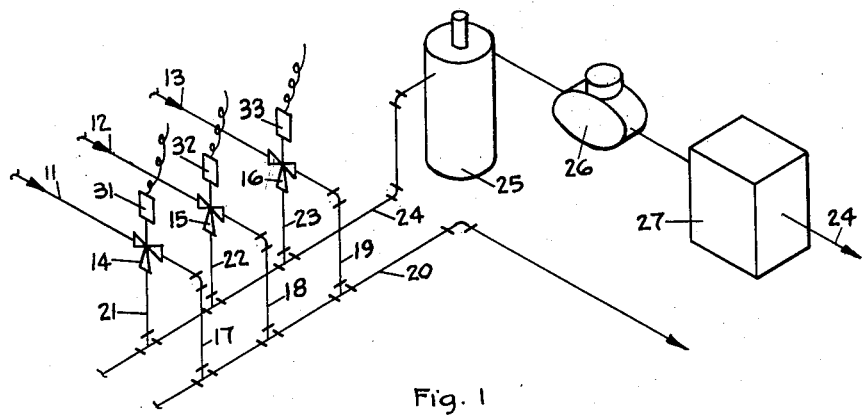
Figure 1 is a schematic diagram illustrating the piping system employed in the present invention between a group of oil wells and the central storage tank or main pipe line for the group.

Referring to Figure 1, any desired number of conduits, for example, three, conduits 11, 12 and 13, which are the production flow lines from three individual wells, are in communication through 3-way valves 14, 15 and 16 and conduits 17, 18 and 19 with a manifold or pipe line 20 which leads to a common storage tank or main pipe line (not shown). Alternatively, conduits 11, 12 and 13 are in communication through valves 14, 15 and 16 and by-pass conduits 21, 22 and 23 with a manifold or by-pass pipe line 24 having connected therein, or in a test conduit extending therefrom, a gas separator 25, a flowmeter 26 and a sampling device 27. The end of the pipe line 24 coming from the sampler is connected to the common storage tank or main pipe line (not shown) in the same manner as pipe line 20. Thus, oil from any one of the individual well conduits 11, 12 and 13 flows either directly to a common storage tank or pipe line (not shown) or through a by-pass pipe line 24 where it is metered and thence to storage.

The 3-way valves 14, 15 and 16 are of the electrically-operated or electrically-actuated types well known to the art, such for example as solenoid-actuated valves, motor-driven valves, etc. Elements 31, 32 and 33 on valves 14, 15 and 16 represent the actuating coils or motors of the valves, to be referred to more specifically in connection with Figure 2. The flowmeter 26 may be of any desired type which is adapted to measure total throughput and is preferably one of the positive-displacement type. Preferably, the flowmeter is provided with electrically-actuated recording means, not shown. As shown in Figure 2, the flowmeter 26 may be provided with a mechanical drive, represented by broken line 35, to rotate an eccentric cam 36 which periodically closes a switch 37 electrically connected into a circuit with a plurality of electric counters 41 to 47.

The circuit shown in Figure 2 is designed to actuate and control the sampling and metering of seven wells, it being understood that a similar circuit could be employed to handle a greater or lesser number of wells. The circuit comprises a series of coils 51 to 57, each of which represents the actuating coil of an electrically-operated 3-way valve 14 shown in Figure 1. Each coil is electrically connected to one of the contacts 61 to 67 of a 7-point stepping switch 68 having a rotatable contact arm 69 which is actuated to move one step at a time by an actuating coil 70.

The actuating coil 70 is momentarily energized every time a switch 71 is closed by a well timer 72. The timer 72 comprises a small electric motor 73 geared to rotate a cam 74 at a predetermined rate, say once every 24 hours, to contact and close switch 71. Power is supplied to the entire circuit from any suitable source through leads 75 and 76.

The well timer 72, by closing the switch 71, also periodically energizes the actuating coil 77 of a second multiple point stepping switch 78 such, for example, as one having 12 contact points 79 to 90 and a rotatable contact arm 92 which is moved one contact each time the actuating coil 77 is momentarily energized. If it is desired to take a sample of fluid each time a well is metered, all contacts 79 to 90 of the stepping switch 78 would be connected to lead 91 which is connected through a switch 93 to an electrically-operated sampling device 27. If, however, a different well is to be metered each day and it is desired that a sample be taken every third day then only contacts 79, 82, 85 and 88 would be connected to lead 91, as shown.

A control switch 93 is positioned in the current lead 91 to the sampler 27. The switch 93 may form part of a sample timer 94 which is a time-delay relay comprising a small electric motor 95 and an actuating coil 96. The elements 93, 95 and 96 are arranged so that every time the meter-driven cam 36 intermittently closes switch 37, the coil 96 is energized and the switch 93 closed to actuate the sampler 27 intermittently in a manner to be described with regard to Figures 3, 4 or 5. In order to make each fluid sample approximately the same size, the motor 95 of the timer 94 causes the switch 93 to be opened after a fixed time interval in a manner well known to the art of time-delay relays. Thus, closure of the meter register switch 37 causes the sample timer 94 to be energized for each increment of production fluid and the sample timer 94 in turn energizes the electrically-operated sampler 27 for a fixed time interval so that a predetermined amount of fluid drops into the sampler for each increment of production fluid that flows through the test meter.

Figure 4:
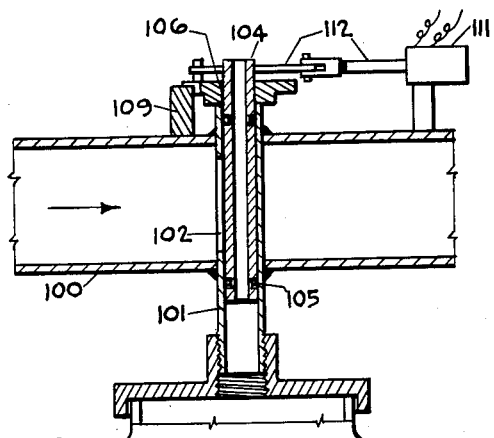
Figures 3, 4 and 5 are plan, front and side elevation views of a sampling device for use with the present apparatus.
Figure 5:
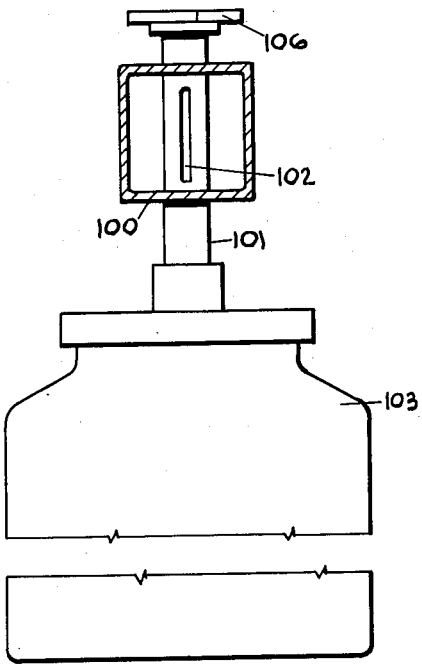
Figure 3:
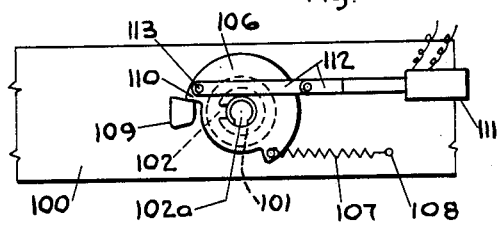

The sampler 27 is illustrated in more detail in Figures 3, 4 and 5. As shown in Figure 5, the sampler 27 is located adjacent a short section of pipe line 100 downstream from the meter 26, said section of line 100 having a square cross section so that the sample obtained is substantially proportional to the height of the liquid in the line. Vertically extending through the pipe 100 is a tube 101 having a slot 102 therein of a height equal to that of the square pipe cross section. The tube 101 is fixedly secured, as by welding, to the square pipe 100 with the slot 102 facing upstream.

Positioned for axial rotation within the bore of the tube 101 is a smaller tube 104, shown in Figure 4, which extends above the outer tube 101. The tube 104 has a vertical slot (102a in Figure 3) corresponding to slot 102 and capable of being put in register therewith by the turning of tube 104. The space between the tubes 101 and 104 may be sealed by O-ring seals 105. As well production fluid flows through the square pipe 100, the flow divides and passes around the small vertical tube 101 with a small portion of the flow passing through the slot 102 and dropping into a sample container 103 removably positioned below the slotted tube 101.

If the pressure within the pipe line 100 is not too great, the upper end of the inner tube 104 is left open. Otherwise, it may be closed in any suitable manner. A plate 106 is fixedly secured to the top of the inner tube 104 for rotating the inner tube 104 relative to the outer tube 101 whereby the inner tube 104 acts as a cylindrical valve to open and close slot 102. The two tubes 101 and 104 are normally positioned so that their slots are not in register with each other. This may be accomplished by means of a tension spring 107 (Figure 3) secured between the rotatable plate 106 and a fixed post 108. Another fixed post 109 is adapted to engage an arm 110 formed on the plate 106 to limit the rotation of the plate and inner tube 104.

The sampler, illustrated in Figures 3 and 4, is actuated by a solenoid 111 which rotates the inner tube so that the slots of the inner and outer tubes 101 and 104 are in alignment for a predetermined time interval, thus allowing a sample of fluid to enter the container 103. A linkage member 112, which is pivoted to the plate 106 at 113, forms the core of the solenoid 111. When the solenoid 111 is energized the member 112 is drawn into the center of the solenoid and the attached plate 106 and inner tube 104 are thus rotated.

In metering the flow from an oil well, it is desirable that the flow be metered over an extended period, say, 24 hours or longer, in order to get a sufficiently accurate figure. The long metering period is especially essential if the daily production from any well is very small. The present invention provides an apparatus for successively metering a large number of wells for short or extended periods, as desired, with the further provision that a composite fluid sample proportional to the flow may be collected throughout the metering period.

In operation, with the well timer 72 (Figure 2) set to close switch 71 momentarily once each 24 hours, the contact arm 69 of the stepping switch 68 is rotated from one contact to another, say from 64 to 65, to energize the coil 55 and thus open a 3-way valve, such as 16 (Figure 1), for a 24-hour period and pipe the well fluid from conduit 13, through by-pass 23, into pipe line 24, and thence through a gas separator 25, meter 26 and sampler 27.

When the contact arm 69 moves to contact 65 and energizes coil 55, it also energizes the electrical counter or recorder 45 through leads 48 and 49 so that an increment of flow is registered on the recorder 45 each time that the meter-driven cam 36 closes switch 37. Recording of the flow continues for 24 hours until the well timer 72 again energizes the stepping switch 68 and its arm 69 is moved to the next contact 66 to actuate the 3-way valve in the flow line from another well. A daily individual production of each of seven wells is recorded on each of the seven meters 41 to 47 thus permitting the metering of many wells by means of a single flowmeter 26. In other words, the individual well production is recorded on separate electrical counters, which are calibrated to read in barrels of production, and each well has its daily well production measured and recorded once each week. This obviates the need of constantly repairing and standardizing a large number of flowmeters.

Since the production fluid from the wells need not be sampled as often as it is metered, a stepping switch 78 is employed which actuates the sampler 72 only once every several days, or at any time interval desired. In the present circuit, only contacts 79, 82, 85 and 88 of the stepping switch 78 are connected to the lead 91 in order to sample only one of the seven wells once every three days over a three week period. However, in order to have the stepping switch 78 energize the sampler so that all the wells are sampled in the above-described manner, it is necessary that the stepping switch 78 selected have a sufficient number of contacts 79 to 90.

When the contact arm 86 of the switch 78 moves to a contact, say 88, wired to lead 91, the solenoid 111 (Figure 4) is energized every time that switch 93 is closed by the coil 96. The coil 96 is energized by one closure of switch 37 by the meter-driven cam 36. Throughout the 24-hour period, small increments of the flow of production fluid in the pipe line 100 are extracted by the rotatable tube 104 of the sampler and dropped into the container 103. The amount of sample collected can be controlled by varying the size of the inner tube 104 or the size of the slots in tubes 101 and/or 104 of the sampler and by varying the time that switch 93 remains closed due to the effect of the motor 95 time delay. The shape of the slots may be varied so as to compensate for the effects of oil-water stratification which could make the sample non-representative.

We claim as our invention:

1. Apparatus for automatically metering and sampling the production fluid in the flow lines of a plurality of wells, said apparatus comprising an electrically-actuated valve in each of said flow lines, a by-pass line leading from each valve, a manifold connecting said by-pass lines, a flowmeter in communication with said manifold, a plurality of recorders adapted to be individually actuated by said flowmeter in response to fluid flow therethrough, said recorders being equal in number to the number of wells being metered, and electrical circuit means actuated by said flow meter for successively actuating one of said valves together with one of said recorders.

2. Apparatus for automatically metering and sampling the production fluid in the flow lines of a plurality of wells, said apparatus comprising an electrically-actuated valve in each of said flow lines, a by-pass line leading from each valve, a manifold connecting said by-pass lines, a flowmeter in communication with said manifold, electrically-actuated sampling means for removing a composite sample from the fluid passing through said manifold, a plurality of recorders adapted to be individually actuated by said flowmeter in response to fluid flow therethrough, said recorders being equal in number to the number of wells being metered, and electrical circuit means including switch means actuated by said flow meter for successively actuating one of said valves together with one of said recorders and second switch means for actuating said sampling means as equal increments of fluid pass through said flowmeter.

3. Apparatus for automatically metering and sampling the production fluid in the flow lines of a plurality of wells, said apparatus comprising an electrically-actuated valve in each of said flow lines, a by-pass line leading from each valve, a manifold connecting said by-pass lines, a test conduit in communication with said manifold, a flowmeter in said test conduit, sampling means for removing a composite sample from the fluid passing through said test conduit, means energized by said flow meter for actuating said sampling means at predetermined time intervals, a plurality of recorders adapted to be individaully actuated by said flowmeter in response to fluid flow therethrough, said recorders being equal in number to the number of wells being metered, and electrical circuit means for energizing said apparatus, said electrical circuit means comprising a power source, a multi-contact stepping switch connecting said valves and recorders to said power source, said stepping switch successively actuating one of said valves and energizing one of said recorders in pairs, whereby fluid from a well flow line is diverted through its by-pass conduit into the test conduit and through the flowmeter therein, a well timer relay for momentarily actuating said stepping switch at predetermined intervals whereby a different valve and recorder are energized, and switch means actuated by said flowmeter in response to fluid flow therethrough for repeatedly closing the circuit of said energized recorder to record increments of fluid passing through said flowmeter.

4. Apparatus for automatically metering and sampling the production fluid in the flow lines of a plurality of wells, said apparatus comprising an electrically-actuated valve in each of said flow lines, a by-pass line leading from each valve, a manifold connecting said by-pass lines, a test conduit in communication with said manifold, a flowmeter in said test conduit, sampling means for removing a composite sample from the fluid passing through said test conduit, means energized by said flow meter for actuating said sampling means at predetermined time intervals, a plurality of recorders adapted to be individually actuated by said flowmeter in response to fluid flow therethrough, said recorders being squal in number to the number of wells being metered, and electrical circuit means for energizing said apparatus, said electrical circuit means comprising a power source, a multi-contact stepping switch connecting said valves and recorders to said power source, said stepping switch successively actuating one of said valves and energizing one of said recorders in pairs, whereby fluid from a well flow line is diverted through its by-pass conduit into the test conduit and through the flowmeter therein, a well timer relay for momentarily actuating said stepping switch at predetermined intervals whereby a different valve and recorder are energized, normally-open switch means in said circuit between said recorders and said power source, and means carried and actuated by said flowmeter in response to fluid flow therethrough for repeatedly closing said normally-open switch means as equal increments of fluid pass through said flowmeter.

5. Apparatus for automatically metering and sampling the production fluid in the flow lines of a plurality of wells, said apparatus comprising an electrically-actuated valve in each of said flow lines, a by-pass line leading from each valve, a manifold connecting said by-pass lines, a test conduit in communication with said manifold, a positive-displacement type flowmeter in said test conduit, sampling means for removing a composite sample from the fluid passing through said test conduit, a plurality of recorders adapted to be individually actuated by said flowmeter, said recorders being equal in number to the number of wells being metered, and electrical circuit means for energizing said apparatus, said electrical circuit means comprising a power source, a multi-contact stepping switch connecting said valves and recorders to said power source, said stepping switch successively actuating one of said valves and energizing one of said recorders in pairs, whereby fluid from a well flow line is diverted through its by-pass conduit into the test conduit and through the flowmeter therein, a well timer relay for momentarily actuating said stepping switch at predetermined intervals whereby a different valve and recorder are energized, switch means actuated by said flowmeter for repeatedly closing the circuit of said energized recorder to record increments of fluid passing through said flowmeter, a second multi-contact stepping switch connecting said sampling means to said power source at predetermined intervals, a normally-open switch in the circuit between the second stepping switch and the sampling means, and means for momentarily closing said normally-open switch to energize said sampler, whereby a small sample of fluid is extracted from said test conduit as equal increments of fluid pass through said flowmeter.

6. Controller means for automatically metering a production flow system from a plurality of wells, comprising a plurality of flow lines from said wells, electrically-actuated valve means in each of said lines, a manifold, a plurality of by-pass lines each connecting said manifold to one of said valve means, a flowmeter responsive to the flow in said manifold, electrical circuit means comprising a source of power, a plurality of actuating windings for said valve means, a plurality of recorders for said flowmeter, each of said windings being connected to and paired with one of said recorders, a stepping switch for successively energizing each of said pairs by connecting the winding and the recorder thereof in parallel to the source of power, time-responsive means for actuating said stepping switch, registering switch means connected to said source of power and to all of said counters in parallel, and means responsive to said flowmeter for actuating said switch means in proportion to the rate of the flow through the flowmeter, whereby the rate of said flow is registered by each of said recorders in succession during the energization thereof.

7. The controller means of claim 6, comprising a flow sampler connected to said manifold, and electrical control means for actuating said sampler to receive a flow from said manifold, said means comprising motor means for said sampler in circuit with said source of power, a control switch connected in series with said motor means, winding means energized by the closure of the stepping switch to close said control switch, and a second stepping switch connected in series with said control switch, said second stepping switch being connected in parallel with the first stepping switch to the time responsive means actuating said switch.

8. Controller means for automatically metering a production flow system from a plurality of wells, comprising a plurality of flow lines from said wells, a solenoid valve in each of said lines, a manifold, a plurality of by-pass lines each connecting said manifold to one of said valves, a positive-displacement type flowmeter responsive to the flow in said manifold, electrical circuit means comprising a source of power, a plurality of actuating windings for said valves, a plurality of recorders for said flowmeter, said windings and said recorders being connected in pairs, a stepping switch for successively energizing each of said pairs by connecting the winding and the recorder thereof in parallel to the source of power, time-responsive means for actuating said stepping switch, normally open registering switch means connected to said source of power and to all of said recorders in parallel, and means carried and driven by said flowmeter for repeatedly closing said switch means in proportion to the rate of the flow through the flowmeter, whereby the rate of said flow is registered by each of said recorders in succession during the energization thereof.

9. In an apparatus for automatically metering and sampling the production fluid in an oil well flow line, a sampling device comprising a short section of pipe of rectangular cross section connected to and forming a part of said flow line, inner and outer concentric tubular members extending diametrically through said section of pipe line of rectangular cross section, each of said tubular members being provided with a longitudinal slot substantially equal in length to the inner diameter of said pipe section, said inner tubular member being of a length such that the upper end thereof extends beyond said outer tubular member, container means positioned adjacent one end of said inner tubular member for receiving a liquid sample therefrom, and means coupled to the other end of said inner tubular member for periodically rotating said inner tubular member so that the slot means of said tubular members are momentarily in register whereby said inner tubular member is in communication with the bore of said flow line.

10. In an apparatus for automatically metering and sampling the production fluid in an oil well flow line, a sampling device comprising a short section of pipe of rectangular cross section connected to and forming a part of said flow line, inner and outer concentric tubular members extending diametrically through said section of pipe line of rectangular cross section, each of said tubular members being provided with a longitudinal slot substantially equal in length to the inner diameter of said pipe section, said inner tubular member being of a length such that the upper end thereof extends beyond said outer tubular member, container means positioned adjacent one end of said inner tubular member for receiving a liquid sample therefrom, linkage means coupled to the other end of said inner tubular member for rotating said inner tubular member through an angle sufficient to bring said slot means of said tubular members in register, and solenoid means for periodically actuating said linkage means whereby the inner tubular member is momentarily in communication with the bore of said flow line.

References Cited in the file of this patent

UNITED STATES PATENTS

| | | |
|---|---|---|
| 2,217,855 | Bassler | Oct. 15, 1940 |
| 2,320,011 | Reynolds | May 25, 1943 |
| 2,380,977 | Lewis | Aug. 7, 1945 |
| 2,461,045 | Fairbairn | Feb. 8, 1949 |
| 2,489,394 | Austin | Nov. 29, 1949 |
| 2,644,934 | Grant | July 7, 1953 |
| 2,672,271 | Gorham | Mar. 16, 1954 |